United States Patent

[11] 3,594,512

[72] Inventor John F. Castagna
835 Remsen Ave., Brooklyn, N.Y. 11236
[21] Appl. No. 765,482
[22] Filed Oct. 7, 1968
[45] Patented July 20, 1971

[54] MAGNETIC TAPE CARTRIDGE SYSTEM
7 Claims, 8 Drawing Figs.

[52] U.S. Cl. 179/100.2 Z, 179/100.2 S, 226/92, 242/195, 242/197, 274/4 F
[51] Int. Cl. G11b 15/34, G11b 5/00
[50] Field of Search 179/100.2 Z, 100.2 S; 340/174.1 C; 226/92; 214/1.1, 1.7; 242/192, 195, 197, 198, 68.3; 274/4 F

[56] References Cited

UNITED STATES PATENTS

| | | | |
|---|---|---|---|
| 1,583,655 | 5/1926 | Chamberlin | 242/68.3 |
| 3,195,825 | 7/1965 | Louzil | 242/195 |
| 3,197,150 | 7/1965 | Camras | 274/4 F |
| 3,208,682 | 9/1965 | Pastor et al. | 179/100.2 X |
| 3,424,393 | 1/1969 | Goodell et al. | 274/4 |
| 3,425,532 | 2/1969 | Dannatt | 242/197 |
| 2,275,498 | 3/1942 | Berndt | 242/197 |
| 3,066,880 | 12/1962 | Bauer | 242/198 |
| 3,092,346 | 6/1963 | Goodell et al. | 242/197 |
| 3,115,289 | 12/1963 | Nameny-Katz | 179/100.2 |
| 3,134,550 | 5/1964 | Camras | 179/100.2 |
| 3,136,464 | 6/1964 | Schmid | 242/195 |
| 3,227,387 | 1/1966 | Laa et al. | 242/195 |
| 3,348,784 | 10/1967 | Gardiner et al. | 242/192 |

*Primary Examiner*—Stanley M. Urynowicz, Jr.
*Attorney*—Philip G. Hilbert

ABSTRACT: A combination magnetic tape cartridge and playback device where the cartridge carries a tape on which is recorded musical material or the like as a very large number of individual selections and arranged for convenience of selection; the playback device being adapted to accommodate cartridges of varying size.

INVENTOR.
John F. Castagna
BY Philip S. Hilbert
ATTORNEY

MAGNETIC TAPE CARTRIDGE SYSTEM

BACKGROUND OF THE INVENTION

Conventional tape cartridges are of a uniform single size since the playback mechanism will only accommodate cartridges of the given size. Such cartridges usually carry tape in endless loop form which entails the need for special means for unwinding and winding the looped tape. It follows that such known tapes can carry but a limited number of selections and such recordings are arranged in end to end relation on the tape. This requires hunting for the desired selection in respect to its particular position on the tape.

Accordingly, an object of this invention is to provide an improved system of tape cartridges and playback means wherein the tape accommodates a large number of individual recordings in side by side relation which facilitates the selection of the desired recording.

Another object of this invention is to provide in a system of the character described, playback means which will accommodate cartridges of varying size and which may be arranged serially for successive playback in any combination of sizes.

A further object of this invention is to provide an improved tape cartridge of the character described, which is compact and has a large capacity for recordings.

Still another object of this invention is to provide in a system of the character described playback means and cartridges which are interlocked during playback so as to be resistant to shock or vibration.

Still a further object of this invention is to provide an improved tape cartridge which is of simple construction, economical to manufacture, affording maximum protection for the tape against deleterious influences.

Yet another object of this invention is to provide an improved system of the character described which lends itself to a variety of controls for highly selective operation of the system.

Other objects of this invention will in part be obvious and in part hereinafter pointed out.

DESCRIPTION OF THE PREFERRED EMBODIMENT

Figures 1, 2, 5:
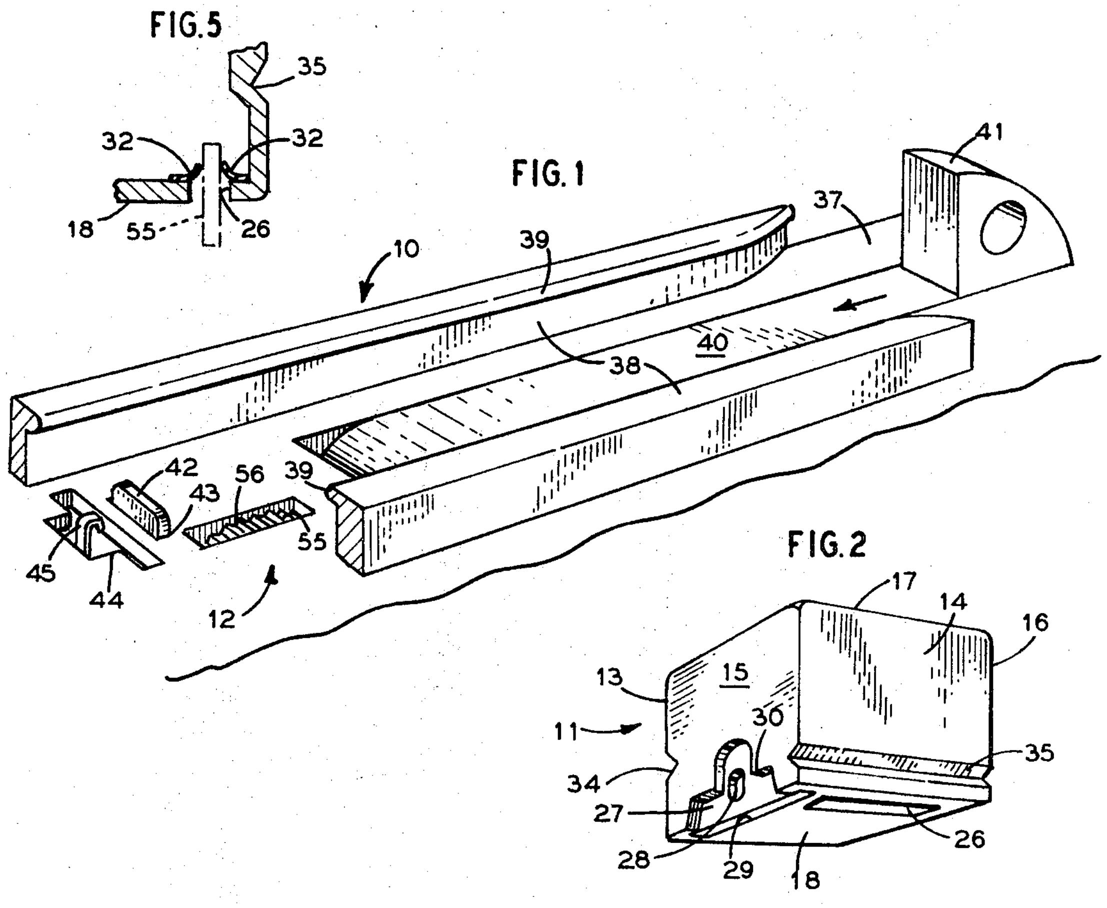
FIG. 1 is a perspective view showing the playback portion of the magnetic tape cartridge system embodying the invention.
FIG. 2 is a perspective view showing the cartridge portion of the system.
FIG. 5 is a partial sectional view showing sealing means for a slot in the cartridge.
Figure 3:
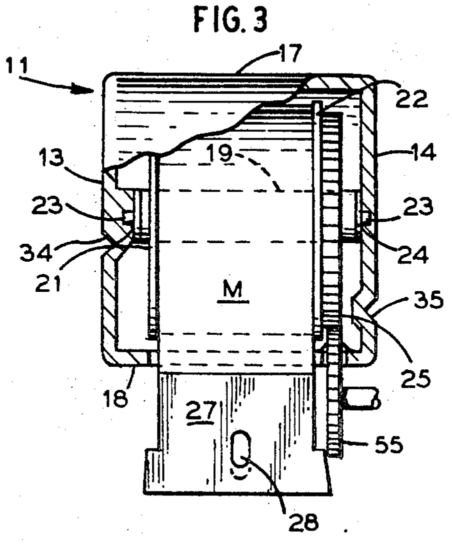
FIG. 3 is a transverse sectional view of the cartridge, with parts broken away.
Figure 4:
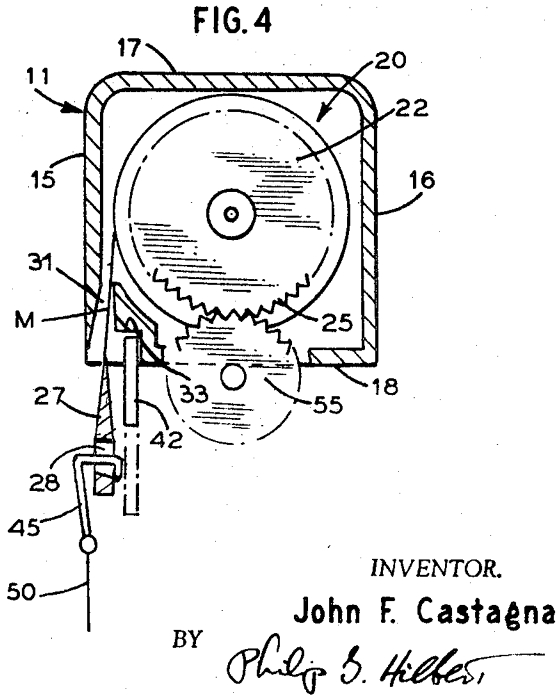
FIG. 4 is a sectional view thereof, in side elevation.
Figures 6, 7:
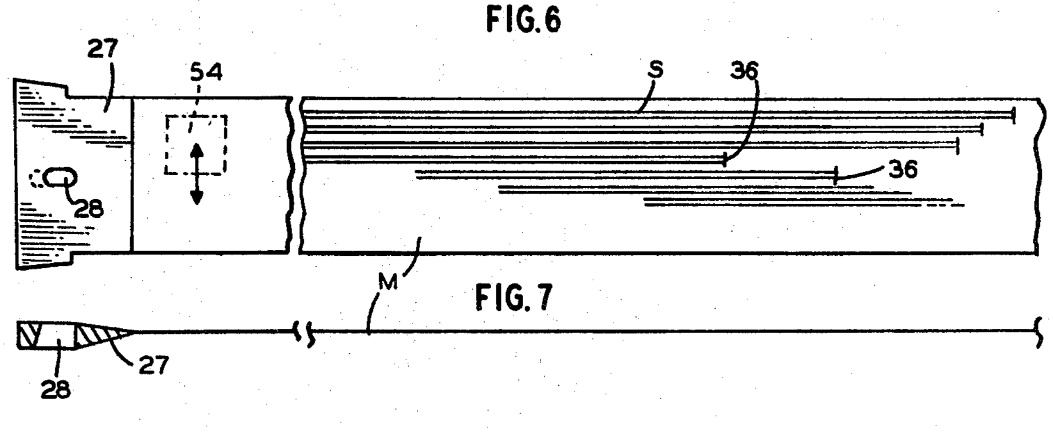
FIG. 6 is a top plan view showing a magnetic tape and its leading end portion, used with the cartridge.
FIG. 7 is a side elevational view thereof.
Figure 8:
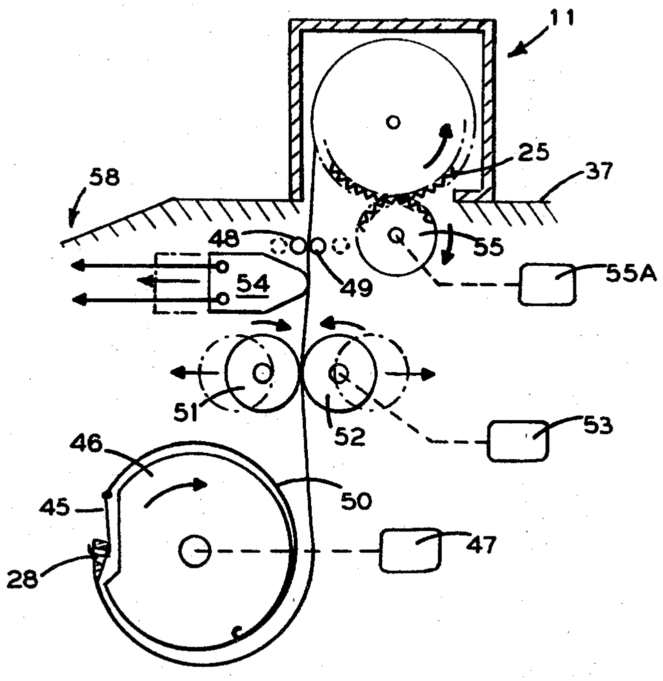
FIG. 8 is a schematic showing of the operation of the cartridge in relation to the playback means.

Referring in detail to the drawings, 10 designates a tape cartridge playback system embodying the invention. The same comprises cartridges generally indicated at 11 and the playback means generally indicated at 12.

The cartridge 11 takes the form of a molded plastic housing having sidewalls 13, 14; end walls 15, 16; a top wall 17 and a bottom wall 18. The magnetic tape M in strip form is carried in the housing on the hub 19 of a molded plastic reel 20 and between flanges 21, 22 thereof. The reel 20 is rotatably mounted in the housing between sidewalls 13, 14 through trunnions 23 snap fitted for rotation in journal recesses 24 on walls 13, 14.

The reel flange 22 is formed with gear teeth 25 on the periphery thereof and which are aligned with a slot 26 formed in bottom wall 18, for the purpose later appearing. The starting end of tape M includes an inverted T-shaped terminal portion section 27 of wedge cross section and formed with a slot 28. The bottom wall 18 of cartridge 11 is formed with a transverse slot 29 to pass tape M outwardly thereof, while front wall 15 is formed an inverted T-shaped opening 30 which merges with slot 29 and exposes tape slot 28; the head of tape portion 27 against movement inwardly of the cartridge.

The wedge-shaped terminal tape portion 27 fits into complementary opposed wall portions to seal tape opening 31 in front wall 15. The slot 26 in bottom wall 18 is normally closed by opposed strips of resilient material 32 which can be displaced for the purpose later appearing. A recess 33 in bottom wall 18 provides locating means for the cartridge 11, as later described in detail. The sidewalls 13, 14 of cartridge 11 are formed with horizontal grooves 34, 35 for guiding the movement of the cartridge on playback means 12.

The tape M is approximately 1inch in width and is adapted to carry thereon about 12pair of stereophonic sound tracks or about 24monaural sound tracks; each sound track carrying a single complete recording which may have from 2to 4minutes of playing time. At the end of each sound track S there is recorded a short supersonic stop signal indicated at 36 for triggering suitable control means, not shown, which is effective to stop further unwinding of tape M and to start rewinding the tape on reel 20.

The playback means 12 may take the form of a small console or the like having a top wall 37 over which cartridges 11 may be moved in succession to a playing position; guide members 38 with guide ribs 39 engaging grooves 34, 35 on the cartridge walls 13, 14 to insure proper longitudinal movement of the cartridges. The cartridges 11 are propelled to their playing position by a conveyor spring 40 and clamp 41 at the free end thereof; said spring having uniform movement and being known in the art under the name "N"N'gator".

A vertically disposed stop member 42 is movably mounted on wall 37, extending through a slot 43 therein, for engaging in recess 33 in cartridge wall 18, to locate the cartridge 11 in its playing position. A T-shaped slot 44 in advance of slot 43 passes a hook member 45 for engaging tape slot 28 to unreel tape M which moves downwardly through slot 44 to a takeup reel 46 rotated by suitable motor means 47. movable guide rollers 48, 49 immediately below slot 44 directs a leader 50 from takeup reel 46 and carrying hook member 45 upwardly to the tape engaging position, suitable means not shown, directing hook member 45 into slot 28.

The takeup reel 46 is then operated to turn in a clockwise direction to pull the tape M downwardly between an idler roller 51 and a driven pinch roller 52 rotated by a motor 53, to place the tape in proper alignment with the usual pickup head 54 which is connected to the usual audio amplifier, not shown. Also, suitable means, not shown, is provided to shift the pickup head 54 transversely of tape M to index with a selected sound track S.

A combination brake and rewind gear 55 is arranged for movement upwardly through a slot 56 in top wall 37 to mesh with gear teeth 25 on reel 20. Friction means on gear 55 allows the unreeling tape M to be moved under taut conditions. The roller 52 moves the tape M downwardly during the playback of the selected sound track S while reel 46 takes up the moving tape.

When tape M has been transported to playback the selected sound track S to the end thereof, stop signal 36 passing through pickup head 54 is effective to move the roller 52 away from roller 51 and to stop the movement of the tape, and to disengage takeup reel 46 from its slip clutch drive. The tape M can now be rewound by way of rewind gear 55 rotated in the proper direction by motor 55 A. The slipping clutch of takeup reel 46 provides proper tension for the rewinding tape M; while the guide rollers 48, 49 maintain alignment of the moving tape as it enters cartridge 11.

The terminal end 27 of tape M passes into the tape opening 31 to seal the same, while articulated hook 45 is shifted out of slot 28 of the tape M, to allow the hook 45 together with stop member 42 to be depressed below the surface of top wall 337. Thus, the spring transport member 40 is effective to move the cartridge 11 toward a storage bin 58, while allowing the next cartridge 11 in line to be moved to the play position, wherein the stop member 42 is reactivated to hold the cartridge in such playing position. The sequence of operations is then repeated.

The strips of seal material 32 on bottom wall 18 of cartridge 11 effectively closes the cartridge against admission of dust or other harmful material, yet may be displaced when rewind gear 55 is moved upwardly through registering slots 56, 26 to engage gear 25. Also, the tapered end 27 of tape M upon moving into opening 31 in the wall 15 of the cartridge, seals the opening and thus makes the cartridge 11 as a whole proof against dust and the like.

It is understood that the sequential operations of the system may be suitably programmed, using known controls. Further, the playing of the cartridges 11 may be programmed as singles, series and with rejection of selected cartridges, by suitable programming means.

I claim:

1. In combination, a playback console and a tape cartridge arranged for movement over said console to a playing position, said console including a top wall, pickup means within said console, first tape reeling means within said console, the top wall of said console being formed with a tape slot and a rewind slot, said cartridge comprising an enclosed casing including a bottom wall and sidewalls, second tape reeling means carrying a roll of tape rotatably mounted within said casing on the side walls thereof, said casing being formed with a tape slot and a rewind slot, movable stop means on the top wall of said console, means on said casing engageable with said stop means for locating said casing in a playing position, whereby the tape slots of said console and casing are in registry and the rewind slots of said console and casing are in registry, thereby allowing tape to pass through said tape slots between the tape reeling means of said console and the tape reeling means of said casing, means for rotating said first tape reeling means to pass the moving tape in engaging relation to said pickup means, rotatable means on said console in alignment with the rewind slot in said console, means on said second tape reeling means engageable with said rotatable means projecting through said rewind slots in said console and casing, and means for rotating said rotatable means for rewinding said tape from said first tape reeling means to said second tape reeling means.

2. The combination as in Claim 1 wherein said cartridge and said console have coacting means for guiding the movement of said cartridge toward the playing position thereof.

3. The combination as in claim 2 wherein said stop means is depressible to release the cartridge for further movement on said console and to allow a succeeding cartridge to move to the playing position.

4. The combination as in claim 1 and further including means for impelling said cartridge over the top wall of said console to the playing position thereof.

5. The combination as in claim 1 wherein said first tape reeling means includes flexible leader means extending therefrom, hook means on the leading end of said leader means, said console being formed with a slot to pass said hook means therethrough, the leading end of said tape being formed with an opening to receive therein said hook means said last mentioned slot including a portion for passing the tape therethrough.

6. The combination as in claim 5 wherein said tape slot in the cartridge casing and the leading end of said tape have complementary tapered cross sections whereby said tape slot is sealed by the leading end of said tape.

7. A magnetic tape cartridge comprising an enclosed casing having a bottom wall, side walls and end walls, a roll of magnetic tape, means for rotatably mounting said tape within the casing on the sidewalls thereof, said bottom wall being formed with a tape slot and a rewind slot, said tape mounting means including rewind means located in alignment with said rewind slot, one end wall of said casing being formed with an inverted T-shaped opening in communicating relation to said tape slot, the leading end of said tape and said tape slot having complementary opposed surface portions for providing seal means for said tape slot when the leading end of the tape is disposed in said tape slot, said inverted T-shaped opening providing access to the leading end of said tape.